United States Patent
Uenoyama et al.

(10) Patent No.: US 11,654,750 B2
(45) Date of Patent: May 23, 2023

(54) CONTROL DEVICE, TERMINAL DEVICE, AND CONTROL METHOD

(71) Applicant: TOYOTA JIDOSHA KABUSHIKI KAISHA, Toyota (JP)

(72) Inventors: Naoki Uenoyama, Nagoya (JP); Koichi Suzuki, Nagoya (JP); Ryo Kamimura, Shizuoka-ken (JP); Daisuke Nakata, Seto (JP); Yuki Tatsumoto, Nagoya (JP); Yusuke Futakuchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 17/202,511

(22) Filed: Mar. 16, 2021

(65) Prior Publication Data
US 2021/0309078 A1   Oct. 7, 2021

(30) Foreign Application Priority Data
Apr. 1, 2020   (JP) .............................. JP2020-066107

(51) Int. Cl.
- B60H 1/32  (2006.01)
- B60W 50/00  (2006.01)
- G01C 21/36  (2006.01)

(52) U.S. Cl.
CPC ........... *B60H 1/32* (2013.01); *B60W 50/0098* (2013.01); *G01C 21/362* (2013.01); *B60H 2001/3266* (2013.01); *B60H 2001/3269* (2013.01); *B60W 2050/0002* (2013.01)

(58) Field of Classification Search
CPC .............. B60H 1/32; B60H 2001/3266; B60H 2001/3269; B60H 1/00985; B60H 1/00964; B60H 1/00771; B60W 50/0098; B60W 2050/0002; G01C 21/362; H04L 67/125; H04L 12/2816; F24F 11/58; F24F 11/70; F24F 11/80; F24F 11/89; F24F 2110/10; F24F 2110/20
See application file for complete search history.

(56) References Cited

U.S. PATENT DOCUMENTS

| | | | |
|---|---|---|---|
| 11,333,384 B1* | 5/2022 | Karimi | F24F 11/63 |
| 2015/0358387 A1* | 12/2015 | Smereka | H04L 67/025 |
| | | | 715/740 |
| 2020/0011687 A1* | 1/2020 | Lindemann | G07C 5/02 |
| 2020/0217550 A1* | 7/2020 | Boyd | F24F 11/74 |

FOREIGN PATENT DOCUMENTS

| | | |
|---|---|---|
| JP | 2001-264077 A | 9/2001 |
| JP | 2003-219485 A | 7/2003 |
| JP | 2009-184549 A | 8/2009 |
| JP | 2010-126029 A | 6/2010 |
| JP | 2018-113586 A | 7/2018 |

* cited by examiner

*Primary Examiner* — Marc E Norman
*Assistant Examiner* — Matthew John Moscola
(74) *Attorney, Agent, or Firm* — Sughrue Mion, PLLC

(57) ABSTRACT

A control device includes a control unit and a communication unit. The control unit is configured to calculate a set value that is the set value of an air conditioner provided in the destination facility of a vehicle and is to be used by the occupants of the vehicle, based on information on the air conditioning environment in the vehicle and is configured to send the calculated set value of the air conditioner to a predetermined sending destination via the communication unit.

10 Claims, 3 Drawing Sheets

CONTROL DEVICE, TERMINAL DEVICE, AND CONTROL METHOD

INCORPORATION BY REFERENCE

The disclosure of Japanese Patent Application No. 2020-066107 filed on Apr. 1, 2020 including the specification, drawings and abstract is incorporated herein by reference in its entirety.

BACKGROUND

1. Technical Field

The present disclosure relates to a control device, a terminal device, and a control method.

2. Description of Related Art

Japanese Unexamined Patent Application Publication No. 2001-264077 (JP 2001-264077 A) describes a technique that predicts the time at which a vehicle will arrive at the installation place of a home appliance such as an air conditioner and, in accordance with the predicted result, gives an operation instruction to the home appliance.

SUMMARY

The conventional technique cannot give sufficient comfort in the air conditioning environment at the destination facility.

The present disclosure provides a technique that increases comfort in the air conditioning environment at a destination facility.

A first aspect of the present disclosure relates a control device including a control unit and a communication unit. The control unit is configured to calculate the set value that is a set value of an air conditioner provided in the destination facility of a vehicle and is to be used by the occupants of the vehicle, based on the information on the air conditioning environment in the vehicle and is configured to send the calculated set value of the air conditioner to a predetermined sending destination via the communication unit.

A second aspect of the present disclosure relates to a terminal device used in the destination facility of a vehicle. The terminal device includes a control unit, a communication unit, and an output unit. The control unit is configured to receive, via the communication unit, the set value that is a set value of an air conditioner provided in the destination facility and is to be used by the occupants of the vehicle and is configured to output the received set value via the output unit or to send the received set value to the air conditioner via the communication unit. The set value of the air conditioner is calculated based on the information on the air conditioning environment in the vehicle.

A third aspect of the present disclosure relates to a control method performed by a control device. The control method includes calculating the set value that is a set value of an air conditioner provided in the destination facility of a vehicle and is to be used by occupants of the vehicle, based on the information on the air conditioning environment in the vehicle, and sending the calculated set value of the air conditioner to a predetermined sending destination.

According to the present disclosure, comfort in the air conditioning environment in the destination facility can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
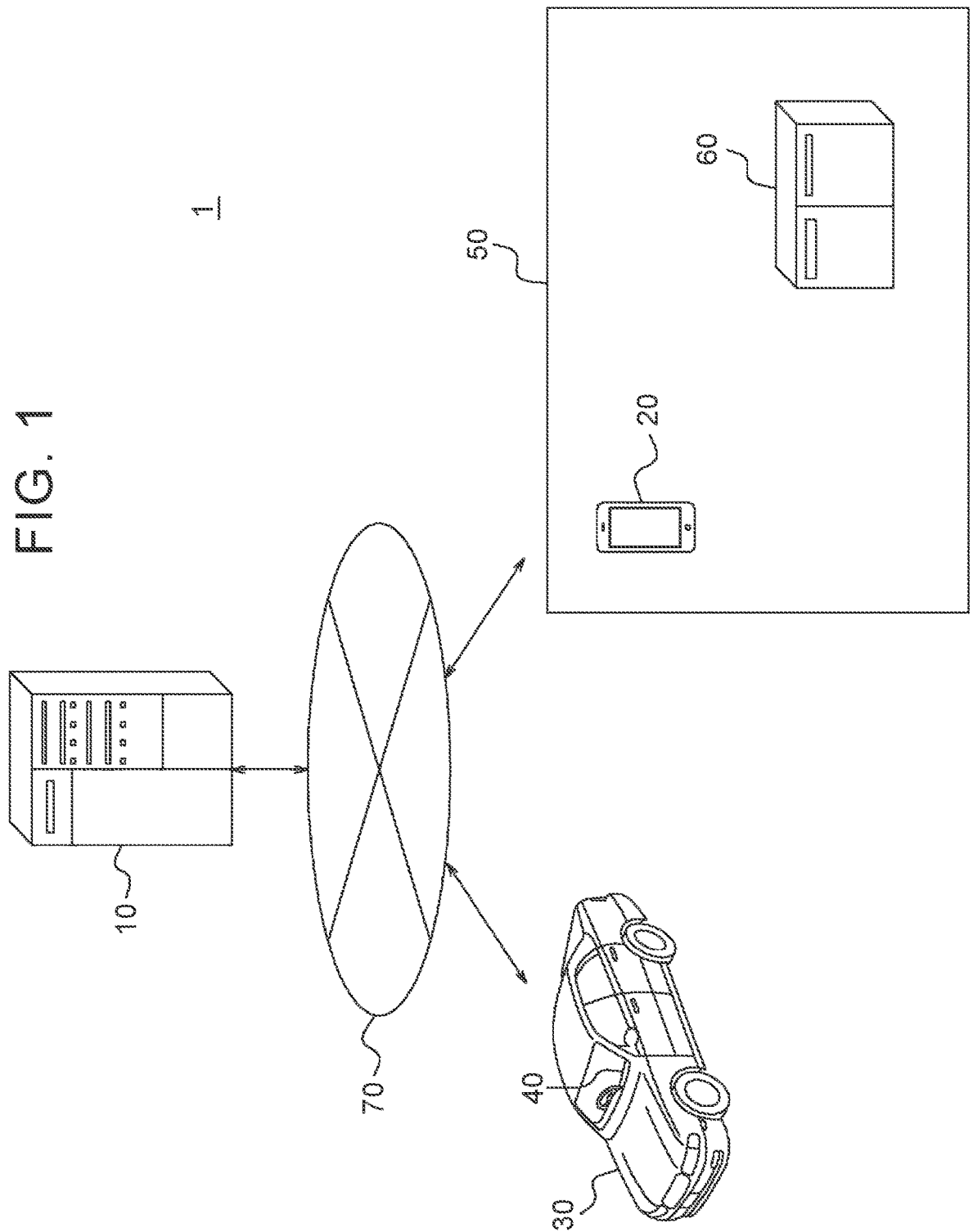
FIG. 1 is a diagram showing the configuration of a control system according to one embodiment.

One embodiment will be described below with reference to the drawings.

In the drawings, the same or similar components are designated by the same reference numeral. In the description of this embodiment, the description of the same or similar components will be appropriately omitted or simplified.

The configuration of a control system 1 according to this embodiment will be described with reference to FIG. 1.

The control system 1 includes at least one control device 10 and at least one terminal device 20.

The control device 10 can communicate with the terminal device 20 and with a vehicle 30 in which a vehicle air conditioner 40 is installed, via a network 70 such as a mobile communication network and the Internet. The control device 10 may be capable of communicating with an air conditioner 60 provided in a destination facility 50 via the network 70.

The terminal device 20 can communicate with the control device 10 via the network 70. The terminal device 20 may be capable of communicating with the air conditioner 60 provided in the destination facility 50 via the network 70.

The vehicle 30 is any type of vehicle such as a gasoline vehicle, a diesel vehicle, an HV, a PHV, an EV, an FCV. "HV" is an abbreviation for "hybrid vehicle." "PHV" is an abbreviation for "plug-in hybrid vehicle." "EV" is an abbreviation for "electric vehicle." "FCV" is an abbreviation for "fuel cell vehicle." The vehicle 30, though driven by a driver in this embodiment, may be driven autonomously at any autonomous level. The autonomous level is any of level 1 to level 5 in the SAE level definition. "SAE" is an abbreviation for "Society of Automotive Engineers." The vehicle 30 may be a MaaS-dedicated vehicle. "MaaS" is an abbreviation for "Mobility as a Service."

The vehicle air conditioner 40 is any type of air conditioner installed in the vehicle 30.

The destination facility 50 is any type of facility including an accommodation facility such as a hotel, an eating and drinking establishment (for example, a restaurant), or the home of an occupant of the vehicle 30.

The air conditioner 60 is any type of air conditioner provided in a room of the destination facility 50.

The outline of this embodiment will be described below with reference to FIG. 1.

The control device 10 calculates the set value that is the set value of the air conditioner 60 provided in the destination facility 50 of the vehicle 30 and is to be used by the occupants of the vehicle 30, based on the information on the air conditioning environment in the vehicle 30. The control device 10 sends the calculated set value of the air conditioner 60 to the terminal device 20 used in the destination facility 50. The terminal device 20 receives the set value of the air conditioner 60 from the control device 10. The terminal device 20 outputs the received set value of the air conditioner 60 to an employee of the destination facility 50.

According to this embodiment, since the set value of the air conditioner 60 in the destination facility 50 is calculated based on the information on the air conditioning environment in the vehicle 30 in which the occupants are riding, the set value suitable for the occupants can be calculated. An employee of the destination facility 50 can operate the air conditioner 60, provided in the destination facility 50, using the set value suitable for the occupants that has been output to the terminal device 20. Therefore, the control system 1 improves the comfort of the air conditioning environment in the destination facility 50.

Figure 2:
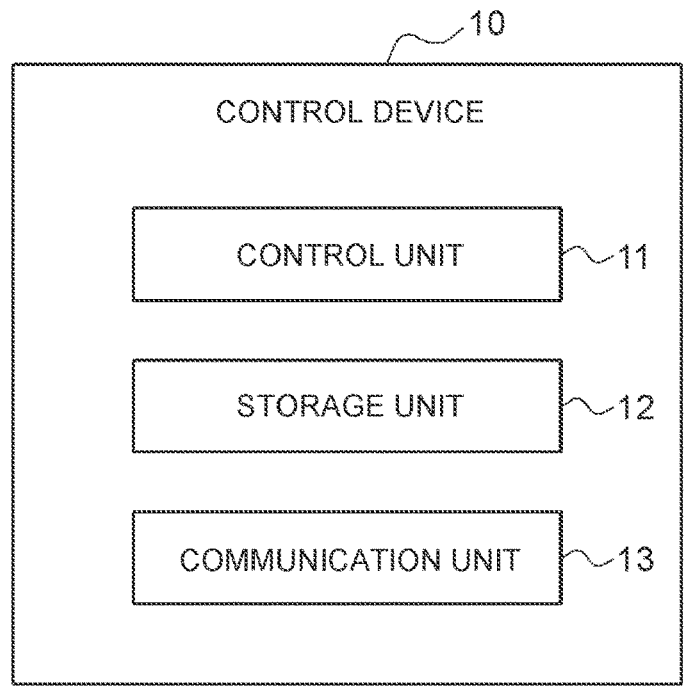
FIG. 2 is a diagram showing the configuration of a control device according to one embodiment.

The configuration of the control device 10 according to the present embodiment will be described below with reference to FIG. 2.

The control device 10 is a server belonging to a cloud computing system or another computing system. Alternatively, the control device 10 may be, for example, a computer mounted in the vehicle 30.

The control device 10 includes a control unit 11, a storage unit 12, and a communication unit 13.

The control unit 11 includes one or more processors, one or more dedicated circuits, or a combination thereof. The processor is a general-purpose processor such as a CPU or is a dedicated processor specialized for specific processing. "CPU" is an abbreviation for "central processing unit." The dedicated circuit is, for example, an FPGA or an ASIC. "FPGA" is an abbreviation for "field-programmable gate array." "ASIC" is an abbreviation for "application specific integrated circuit." The control unit 11 performs the information processing related to the operation of the control device 10 while controlling the components of the control device 10.

The storage unit 12 includes one or more semiconductor memories, one or more magnetic memories, one or more optical memories, or a combination of at least two of these memories. The semiconductor memory is, for example, a RAM or a ROM. "RAM" is an abbreviation for "random access memory." "ROM" is an abbreviation for "read only memory." The RAM is, for example, an SRAM or a DRAM. "SRAM" is an abbreviation for "static random access memory." "DRAM" is an abbreviation for "dynamic random access memory." The ROM is, for example, an EEPROM. "EEPROM" is an abbreviation for "electrically erasable programmable read only memory." The storage unit 12 functions, for example, as a main storage device, an auxiliary storage device, or a cache memory. The storage unit 12 stores the information used for the operation of the control device 10 and the information obtained by the operation of the control device 10.

The communication unit 13 includes one or more communication interfaces. The communication interface is an interface corresponding to a mobile communication standard, such as the LTE standard, 4G standard, or 5G standard, or is a LAN interface. "LTE" is an abbreviation for "Long Term Evolution." "4G" is an abbreviation for "4th generation." "5G" is an abbreviation for "5th generation." "LAN" is an abbreviation for "local area network." The communication unit 13 receives the information used for the operation of the control device 10 and sends the information obtained by the operation of the control device 10.

The function of the control device 10 is implemented by causing the processor, included in the control unit 11, to execute the control program according to this embodiment. That is, the function of the control device 10 is implemented by software. The control program is a program that causes the computer to perform the processing of the steps included in the operation of the control device 10 so that the computer implements the function corresponding to the processing of the steps. That is, the control program is a program that causes the computer to function as the control device 10.

A program can be recorded in a computer-readable non-transitory storage medium. The computer-readable non-transitory storage medium is, for example, a magnetic recording device, an optical disc, a magneto-optical recording medium, or a semiconductor memory. A program is distributed, for example, by selling, transferring, or renting a portable storage medium such as a DVD or a CD-ROM in which the program is recorded. "DVD" is an abbreviation for "digital versatile disc." "CD-ROM" is an abbreviation for "compact disc read only memory." A program may also be stored in the storage of a server so that the program can be transferred from the server to another computer for program distribution. A program may also be provided as a program product.

The computer stores a program, recorded in a portable storage medium, or a program, transferred from the server, once in the main storage device. Then, the computer causes the processor to read the program, stored in the main storage device, and causes the processor to perform processing according to the program that has been read. The computer may also read the program directly from the portable storage medium for performing processing according to the program. In addition, each time a program is transferred from the server to the computer, the computer may sequentially perform processing according to the received program. The computer may also perform processing by the so-called ASP type service in which, instead of transferring a program from the server to the computer, the function is implemented simply by sending the execution instruction and then by acquiring the result. "ASP" is an abbreviation for "application service provider." A program mentioned above includes the information that is used for processing by the electronic computer and is equivalent to a program. For example, when data is not a command directly causing the computer to perform processing but has the property of defining the processing of the computer, the data falls under "information equivalent to a program."

A part or all of the functions of the control device 10 may be implemented by a dedicated circuit included in the control unit 11. That is, a part or all of the functions of the control device 10 may be implemented by hardware.

Figure 3:
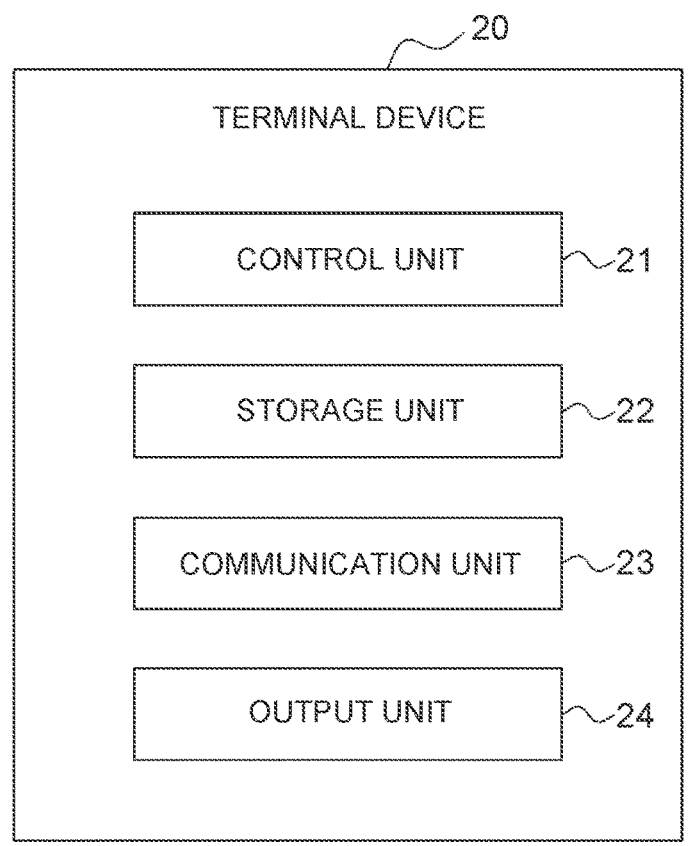
FIG. 3 is a diagram showing the configuration of a terminal device according to one embodiment.

The configuration of the terminal device 20 in this embodiment will be described below with reference to FIG. 3.

The terminal device 20 is a mobile phone, a smart phone, a tablet, or a PC used in the destination facility 50 of the vehicle 30. "PC" is an abbreviation for "personal computer."

The terminal device 20 includes a control unit 21, a storage unit 22, a communication unit 23, and an output unit 24.

The control unit 21 includes one or more processors, one or more dedicated circuits, or a combination thereof. The processor is a general-purpose processor such as a CPU or a dedicated processor specialized for specific processing. The dedicated circuit is, for example, an FPGA or an ASIC. The control unit 21 performs information processing related to the operation of the terminal device 20 while controlling the components of the terminal device 20.

The storage unit 22 includes one or more semiconductor memories, one or more magnetic memories, one or more optical memories, or a combination of at least two of these memories. The semiconductor memory is, for example, a RAM or a ROM. The RAM is, for example, an SRAM or a DRAM. The ROM is, for example, an EEPROM. The storage unit 22 functions, for example, as a main storage device, an auxiliary storage device, or a cache memory. The storage unit 22 stores the information used for the operation of the terminal device 20 and the information obtained by the operation of the terminal device 20.

The communication unit 23 includes one or more communication interfaces. The communication interface is an interface corresponding to a mobile communication standard such as the LTE standard, 4G standard, or 5G standard, or is a LAN interface. The communication unit 23 receives the information used for the operation of the terminal device 20, and sends the information obtained by the operation of the terminal device 20.

The output unit 24 includes one or more output interfaces. The output interface is, for example, a display or a speaker. The display is, for example, an LCD or an organic EL display. "LCD" is an abbreviation for "liquid crystal display." "EL" is an abbreviation for "electro luminescence." The output unit 24 outputs the information obtained by the operation of the terminal device 20. The output unit 24 may be connected to the terminal device 20 as an external output device instead of being provided in the terminal device 20. In this case, the output unit 24 may be connected using any connection method such as USB, HDMI (registered trademark), or Bluetooth (registered trademark). "USB" is an abbreviation for "universal serial bus." "HDMI (registered trademark)" is an abbreviation for "high-definition multimedia interface."

The function of the terminal device 20 is implemented by causing the processor, included in the control unit 21, to execute the terminal program according to this embodiment. That is, the function of the terminal device 20 is implemented by software. The terminal program is a program that causes the computer to perform the processing of the steps included in the operation of the terminal device 20 so that the computer implements the function corresponding to the processing of the steps. That is, the terminal program is a program that causes the computer to function as the terminal device 20.

A part or all of the functions of the terminal device 20 may be implemented by a dedicated circuit included in the control unit 21. That is, a part or all of the functions of the terminal device 20 may be implemented by hardware.

Figure 4:
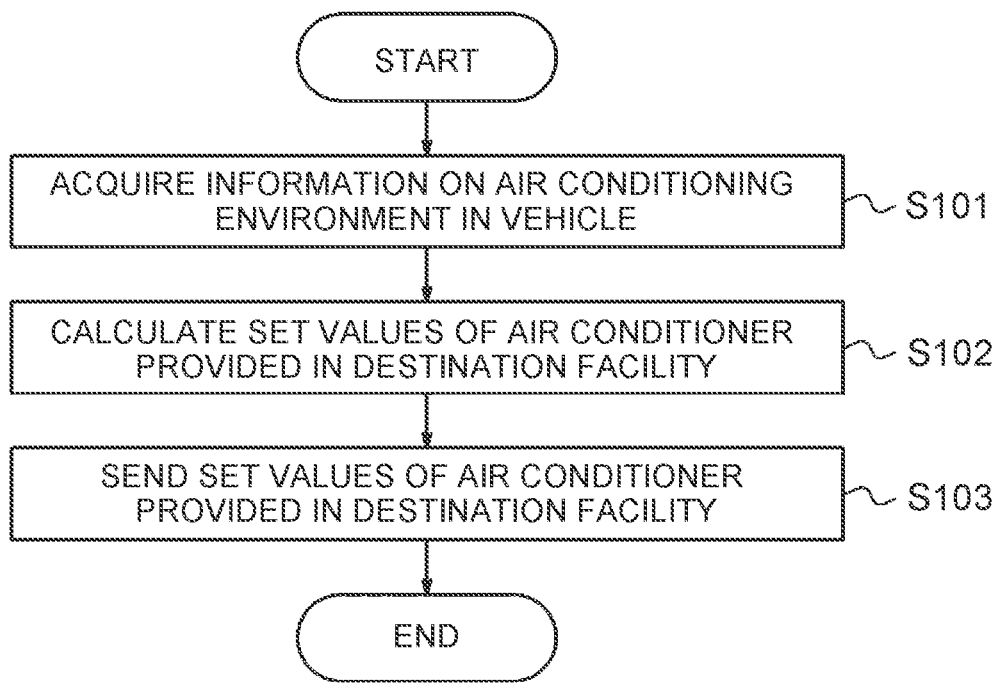
FIG. 4 is a diagram showing the operation of the control system according to one embodiment.
Figure 5:
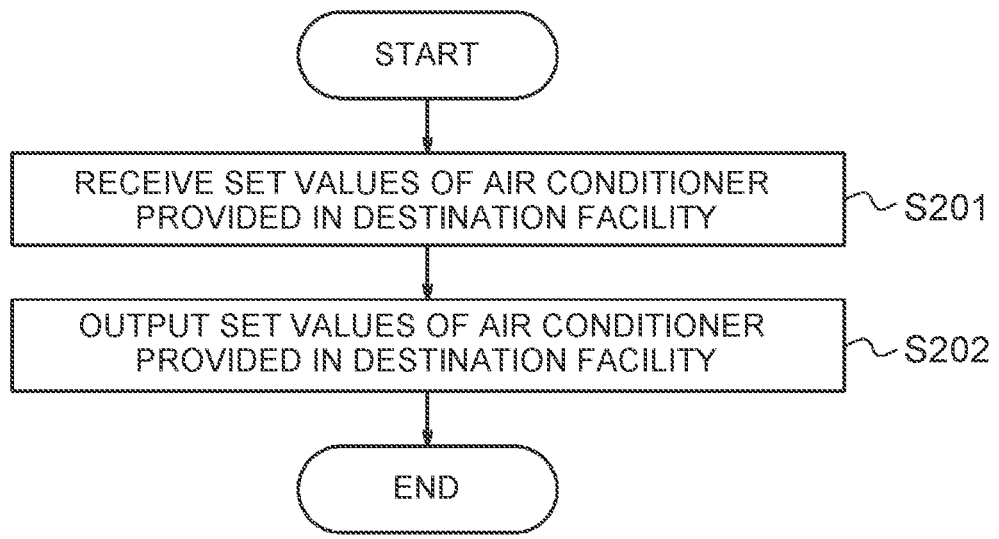
FIG. 5 is a diagram showing the operation of the control system according to one embodiment.

The operation of the control system 1 according to this embodiment will be described below with reference to FIGS. 4 and 5. This operation corresponds to the control method in this embodiment.

In the example below, it is assumed that an occupant in the vehicle 30 has entered the name or address of an accommodation facility, corresponding to the destination facility 50 of the vehicle 30, into the car navigation device mounted in the vehicle 30 and that the vehicle 30 is traveling toward the accommodation facility. In addition, it is assumed that the storage unit 12 of the control device 10 stores the information such as the name or address of the accommodation facility acquired, via the network 70, from the car navigation device mounted in the vehicle 30. In addition, it is assumed that the storage unit 12 of the control device 10 stores the information such as the IP addresses that respectively identify the terminal devices 20 used in the various accommodation facilities in such a way that each of the IP addresses is associated with the information such as the name or address of the corresponding accommodation facility. "IP" is an abbreviation for "Internet protocol." In addition, it is assumed that the storage unit 22 of the terminal device 20 stores the reservation information entered by an employee of the accommodation facility. The reservation information includes the names of the occupants of the vehicle 30 who are the guests, and the number of the room in which the occupants of the vehicle 30 who are the guests will stay.

In step S101, the control unit 11 of the control device 10 acquires the information on the air conditioning environment in the vehicle 30 via the communication unit 13.

More specifically, the control unit 11 of the control device 10 acquires at least one of the value of the set temperature, value of the set humidity, value of the set wind direction, and value of the set air volume of the vehicle air conditioner 40, mounted in the vehicle 30, via the communication unit 13. When the vehicle air conditioner 40 is a so-called automatic air conditioner, the control unit 11 of the control device 10 acquires at least one of the value of the set temperature, value of the set humidity, value of the set wind direction, and value of the set air volume of the vehicle air conditioner 40 from the vehicle 30 via the communication unit 13. On the other hand, when the vehicle air conditioner 40 is a so-called manual air conditioner, the control unit 11 of the control device 10 captures the captured data on the operation panel of the vehicle air conditioner 40, captured by the in-vehicle camera mounted in the vehicle 30, via the communication unit 13. The control unit 11 of the control device 10 analyzes the image of the acquired captured data and, as a result of the analysis, acquires at least one of the value of the set temperature, value of the set humidity, value of the set wind direction, and the value of the set air volume of the vehicle air conditioner 40.

When the vehicle air conditioner 40 can be provided for each seat of the vehicle 30, the control unit 11 of the control device 10 may acquire, via the communication unit 13, at least one of the value of the set temperature, value of the set humidity, value of the set wind direction, and value of the set air volume of the vehicle air conditioner 40 provided for each seat of the vehicle 30. By acquiring the set value for each seat in this way, the set value that is the set value of the air conditioner 60 and is to be used by the occupant in each seat is calculated in step S102, which will be described below, also when a plurality of passengers is in the vehicle 30. Examples of the vehicle air conditioner 40 for which at least one of the temperature, humidity, wind direction, and air volume can be set for each seat of the vehicle 30 include, but are not limited to, a so-called dual-type air conditioner and an air conditioner used in a bus. The air conditioner used in a bus has an air conditioner main body common to the seats of the vehicle 30 and, for each seat, an air outlet connected to the air conditioner main body.

Instead of acquiring at least one of the value of the set temperature, value of the set humidity, value of the set wind direction, and value of the set air volume of the vehicle air conditioner 40 via the communication unit 13, the control unit 11 of device 10 may acquire at least one of the observed value of the temperature, observed value of the humidity, observed value of the wind direction, and observed value of the air volume in the vehicle 30. The observed value of the temperature, observed value of the humidity, observed value of the wind direction, and observed value of the air volume can be detected by any sensor provided integrally with the vehicle air conditioner 40 or provided in the vehicle 30 separately from the vehicle air conditioner 40.

In step S102, the control unit 11 of the control device 10 calculates the set value that is the set value of the air conditioner 60 provided in the accommodation facility corresponding to the destination facility 50 of the vehicle 30 and is to be used by the occupants of the vehicle 30, based on the information on the air conditioning environment in the vehicle 30 acquired in step S101.

More specifically, the control unit 11 of the control device 10 calculates the set value that is the set value of the air conditioner 60 and is to be used by the occupants of the vehicle 30, according to at least one of the value of the set temperature, value of the set humidity, value of the set wind direction, and value of the set air volume of the vehicle air conditioner 40 acquired in step S101. For example, the control unit 11 applies at least one of the value of the set temperature, value of the set humidity, value of the set wind direction, and value of the set air volume of the vehicle air conditioner 40, acquired in step S101, directly to the set value that is the set value of the air conditioner 60 and is to be used by the occupants of the vehicle 30.

When at least one of the temperature, humidity, wind direction, and air volume of the vehicle air conditioner 40 can be set for each seat of the vehicle 30, the control unit 11 of the control device 10 may calculate the set value that is the set value of the air conditioner 60 and is to be used by each of the occupants of the vehicle 30, according to at least one of the value of the set temperature, value of the set humidity, value of the set wind direction, and value of the set air volume of the vehicle air conditioner 40 that is set for each seat of the vehicle 30. At least one of these values is the one acquired in step S101.

The control unit 11 of the control device 10 may calculate the set value that is the set value of the air conditioner 60 and is to be used by the occupants of the vehicle 30, according to at least one of the observed value of the temperature, observed value of the humidity, observed value of the wind direction, and observed value of the air volume in the vehicle 30 acquired in step S101. For example, the control unit 11 may apply at least one of the observed value of the temperature, observed value of the humidity, observed value of the wind direction, and observed value of the air volume in the vehicle 30, acquired in step S101, directly to the set value that is the set value of the air conditioner 60 and is to be used by the occupants of the vehicle 30.

Note that people may wear outdoor clothes when they are in a vehicle while people may wear at-home clothes when they are in a room of an accommodation facility. In this case, the feeling temperature is different between the vehicle cabin and the room inside. Therefore, when calculating the set value of the air conditioner 60, it is preferable that the control unit 11 of the control device 10 consider the amount of clothing of the occupants of the vehicle 30. More specifically, the control unit 11 first acquires, via the communication unit 13, the captured data on the occupants, sitting in the seats of the vehicle 30, captured by the in-vehicle camera mounted in the vehicle 30. Next, the control unit 11 analyzes the image of the acquired captured data to calculate the amount of clothing worn by the occupants of the vehicle 30. Then, according to the calculated amount of clothing of the occupants of the vehicle 30, the control unit 11 calculates a correction value for at least one of the value of the set temperature, value of the set humidity, value of the set wind direction, and value of the set air volume of the vehicle air conditioner 40. For example, the correction value for the value of the set temperature is a positive value. This correction value increases as the amount of clothing increases and approaches zero as the amount of clothing decreases.

The correction value for the value of the set humidity is a positive value. This correction value increases as the amount of clothing increases and approaches zero as the amount of clothing decreases. The correction value for the value of the set air volume is a negative value. The absolute value of this correction value increases as the amount of clothing increases and the absolute value approaches zero as the amount of clothing decreases. The correction value for the value of the set wind direction is a value that indicates an angle change of the louvers. This correction value is adjusted so that a direct airflow is avoided as the amount of clothing increases and is adjusted so that the amount of angle change approaches zero as the amount of clothing decreases. After that, the control unit 11 adds the calculated correction value to at least one of the value of the set temperature, value of the set humidity, value of the set wind direction, and value of the set air volume of the vehicle air conditioner 40 to calculate the set value that is the set value of the air conditioner 60 and is to be used by the occupants of the vehicle 30. Alternatively, the control unit 11 calculates a correction value for at least one of the observed values of the temperature, observed value of the humidity, observed value of the wind direction, and observed value of the air volume in the vehicle 30 according to the calculated amount of clothing of the occupants of the vehicle 30. For example, the correction value for the observed value of the temperature is a positive value. This correction value increases as the amount of clothing increases and approaches zero as the amount of clothing decreases. The correction value for the observed value of the humidity is a positive value. This correction value increases as the amount of clothing increases and approaches zero as the amount of clothing decreases. The correction value for the observed value of the air volume is a negative value. The absolute value of this value increases as the amount of clothing increases and the absolute value approaches zero as the amount of clothing decreases. The correction value for the observed value of the wind direction is a value that indicates an angle change of the louvers. This correction value is adjusted so that a direct airflow is avoided as the amount of clothing increases and is adjusted so that the amount of angle change approaches zero as the amount of clothing decreases. After that, the control unit 11 of the control device 10 adds the calculated correction value to at least one of the observed value of the temperature, observed value of the humidity, observed value of the wind direction, and observed value of the air volume in the vehicle 30 to calculate the set value that is the set value of the air conditioner 60 and is to be used by the occupants of the vehicle 30.

In the example below, it is assumed that the control unit 11 of the control device 10 uses the information stored in the storage unit 12, such as the name or address of the accommodation facility corresponding to the destination facility 50 of the vehicle 30, to identify the terminal device 20 used in the accommodation facility. It is also assumed that the control unit 11 of the control device 10 acquires, via the communication unit 13, the identification information, including the names of the occupants of the vehicle 30, from any terminal device used in the vehicle 30 or from any external server.

In step S103, the control unit 11 of the control device 10 sends the set value that is the set value of the air conditioner 60 provided in the destination facility 50 of the vehicle 30 and is to be used by the occupants of the vehicle 30 to the terminal device 20, used in the accommodation facility corresponding to the destination facility 50 of the vehicle 30, via the communication unit 13. The set value of the air conditioner 60 is the value that was calculated in step S102.

More specifically, the control unit 11 of the control device 10 sends at least one of the value of the set temperature, value of the set humidity, value of the set wind direction, and value of the set air volume that is the value of the air conditioner 60 and is to be used by the occupants of the vehicle 30 to the terminal device 20 via the communication unit 13. The control unit 11 of the control device 10 sends the identification information, including the names of the occupants of the vehicle 30, to the terminal device 20 via the communication unit 13.

When at least one of the temperature, humidity, wind direction, and air volume of the vehicle air conditioner 40 can be set for each seat of the vehicle 30, the control unit 11 of the control device 10 may send at least one of the value of the set temperature, value of the set humidity, value of the set wind direction, and value of the set air volume that is the value of the air conditioner 60 and is to be used by each occupant of the vehicle 30 to the terminal device 20 via the communication unit 13.

In step S201, the control unit 21 of the terminal device 20, which is used in the accommodation facility corresponding to the destination facility 50 of the vehicle 30, receives the set value that is the set value of the air conditioner 60 provided in the accommodation facility corresponding to the destination facility 50 and is to be used by the occupants of the vehicle 30 via the communication unit 23. The set value of the air conditioner 60 is the value that was sent in step S103.

More specifically, the control unit 21 of the terminal device 20 receives, via the communication unit 23, at least one of the value of the set temperature, value of the set humidity, value of the set wind direction, and value of the set air volume that is the value of the air conditioner 60 and is to be used by the occupants of the vehicle 30. When the identification information including the names of the occupants of the vehicle 30 is received via the communication unit 23, the control unit 21 refers to the reservation information, stored in the storage unit 22, to identify the room number of the room in which the occupants of the vehicle 30 will stay.

In step S202, the control unit 21 of the terminal device 20, which is used in the accommodation facility corresponding to the destination facility 50 of the vehicle 30, outputs the set value of the air conditioner 60, provided in the accommodation facility corresponding to the destination facility 50, via the output unit 24 by display or by voice. The set value is the value that was received in step S201.

More specifically, the control unit 21 of the terminal device 20 outputs, by display or by voice, at least one of the value of the set temperature, value of the set humidity, value of the set wind direction, and value of the set air volume that have been received, together with the identified room number, to an employee of the accommodation facility corresponding to the destination facility 50 via the output unit 24. The display or voice that is output in this way allows an employee of the accommodation facility to operate the air conditioner 60 provided in the room where the occupants of the vehicle 30 will stay, using at least one of the set temperature, set humidity, set wind direction, and set air volume that is to be used by the occupants of the vehicle 30.

When at least one of the temperature, humidity, wind direction, and air volume of the vehicle air conditioner 40 can be set for each seat of the vehicle 30, the control unit 21 of the terminal device 20 may receive, via the communication unit 23, at least one of the value of the set temperature, value of the set humidity, value of the set wind direction, and value of the set air volume that is the set value of the air conditioner 60 and is to be used by each of the occupants of the vehicle 30. In that case, via the output unit 24, the control unit 21 of the terminal device 20 outputs, by display or by voice, at least one of the value of the set temperature, value of the set humidity, value of the set wind direction, and value of the set air-volume, which have been received, for each occupant of the vehicle 30, together with the specified room number, to an employee of the accommodation facility.

In this embodiment, the control unit 11 of the control device 10 calculates the set value that is the set value of the air conditioner 60 provided in the destination facility 50 of the vehicle 30 and is to be used by the occupants of the vehicle 30, based on the information on the air conditioning environment in the vehicle 30, as described above. The control unit 11 of the control device 10 sends the calculated set value of the air conditioner 60 to the terminal device 20, used in the destination facility 50, via the communication unit 13. The control unit 21 of the terminal device 20 receives the set value of the air conditioner 60 from the control device 10 via the communication unit 23. The control unit 21 of the terminal device 20 outputs the received set value of the air conditioner 60 via the output unit 24.

According to this embodiment, an employee of the destination facility 50 can operate the air conditioner 60, provided in the destination facility 50, by the time the vehicle 30 arrives at the destination facility 50, using the set value that is to be used by the occupants of the vehicle 30. Therefore, this embodiment improves the comfort of the air conditioning environment in the destination facility 50.

In one modification of this embodiment, the control unit 11 of the control device 10 calculates the set value that is the set value of the air conditioner 60 provided in the destination facility 50 of the vehicle 30 and is to be used by the occupants of the vehicle 30, based on the information on the air conditioning environment in the vehicle 30. The control unit 11 of the control device 10 sends the calculated set value of the air conditioner 60 to the terminal device 20, used in the destination facility 50, via the communication unit 13. The control unit 21 of the terminal device 20 receives the set value of the air conditioner 60 from the control device 10 via the communication unit 23. The control unit 21 of the terminal device 20 sends the received set value of the air conditioner 60 to the air conditioner 60 via the communication unit 23. When the set value of the air conditioner 60 is received from the terminal device 20, the air conditioner 60 starts operation using the received set value.

More specifically, the control unit 11 of the control device 10 first acquires the information on the air conditioning environment in the vehicle 30 via the communication unit 13 in the same manner as in step S101 described above. Next, the control unit 11 calculates the set value that is the set value of the air conditioner 60 and is to be used by the occupants of the vehicle 30 in the same manner as in step S102 described above. Next, the control unit 11 sends the calculated set value of the air conditioner 60 to the terminal device 20 via the communication unit 13 in the same manner as in step S103 described above. Next, the control unit 21 of the terminal device 20 receives the set value of the air conditioner 60 from the control device 10 via the communication unit 23 in the same manner as in step S201 described above. Next, instead of the processing in step S202 described above, the control unit 21 sends the received set value of the air conditioner 60 to the air conditioner 60 via the communication unit 23. Then, when the set value of the air conditioner 60 is received from the terminal device 20, the air conditioner 60 automatically starts operation using the received set value.

According to this modification, the air conditioner 60, provided in the destination facility 50, can automatically start operation by the time the vehicle 30 arrives at the destination facility 50, using the set value that is to be used by the occupants of the vehicle 30. Therefore, this modification eliminates the need for an employee of the destination facility 50 to manually operate the air conditioner 60 and, at the same time, improves the comfort of the air conditioning environment in the destination facility 50. This modification is also useful when no one is at the home of the occupant of the vehicle 30 that corresponds to the destination facility 50 to which the vehicle 30 is traveling.

In one modification of this embodiment, the control unit 11 of the control device 10 calculates the set value that is the set value of the air conditioner 60 provided in the destination facility 50 of the vehicle 30 and is to be used by the occupants of the vehicle 30, based on the information on the air conditioning environment in the vehicle 30. The control unit 11 of the control device 10 sends the calculated set value of the air conditioner 60 to the air conditioner 60 via the communication unit 13. When the set value of the air conditioner 60 is received from the control device 10, the air conditioner 60 starts operation using the received set value.

More specifically, the control unit 11 of the control device 10 first acquires the information on the air conditioning environment in the vehicle 30 via the communication unit 13 in the same manner as in step S101 described above. Next, the control unit 11 calculates the set value that is the set value of the air conditioner 60 and is to be used by the occupants of the vehicle 30 in the same manner as in step S102 described above. Next, instead of the processing in step S103 described above, the control unit 11 sends the calculated set value of the air conditioner 60 to the air conditioner 60 via the communication unit 13. Next, instead of the processing in steps S201 and S202 described above, when the set value of the air conditioner 60 is received from the control device 10, the air conditioner 60 automatically starts operation using the received set value.

According to this modification, the air conditioner 60 provided in the destination facility 50 can automatically start operation by the time the vehicle 30 arrives at the destination facility 50, using the set value that is to be used by the occupants of the vehicle 30. Therefore, this modification eliminates the need for an employee of the destination facility 50 to manually operate the air conditioner 60 and, at the same time, improves the comfort of the air conditioning environment in the destination facility 50.

This modification is also useful when no one is at the home of the occupant of the vehicle 30 that corresponds to the destination facility 50 to which the vehicle 30 is traveling.

In one modification of this embodiment, the control unit 11 of the control device 10 calculates the set value that is the set value of the air conditioner 60, provided in a restaurant corresponding to the destination facility 50 of the vehicle 30, and that is to be used by the occupants of the vehicle 30, based on the information on the air conditioning environment in the vehicle 30. The control unit 11 of the control device 10 sends, via the communication unit 13, the calculated set value of the air conditioner 60 to the terminal device 20 that is used in the restaurant corresponding to the destination facility 50. The control unit 21 of the terminal device 20 receives the set value of the air conditioner 60 from the control device 10 via the communication unit 23.

The control unit 21 of the terminal device 20 outputs the received set value of the air conditioner 60 via the output unit 24.

According to this modification, employees of a restaurant can determine the seat arrangement in the restaurant based on the set value that is the set value of the air conditioner 60 and is to be used by the occupants of the vehicle 30. For example, the employees of the restaurant appropriately adjust the positions of the tables or chairs relative to the air conditioner 60, or adjusts the distance from the tables or chairs to the air conditioner 60, based on the set value of the air conditioner 60 that has been output to the terminal device 20. Therefore, this modification improves the comfort of the air conditioning environment in the restaurant corresponding to the destination facility 50.

The present disclosure is not limited to the above embodiments. For example, a plurality of blocks included in the block diagram may be integrated, or one block may be divided. Instead of performing the steps shown in the flowchart in chronological order according to the description, the steps may be performed in parallel or in a different order depending on the processing capability of the device that performs the steps or depending upon the necessity. Other changes may be made without departing from the spirit of the present disclosure.

What is claimed is:

1. A control device comprising
a processor configured to:
calculate a set value that is a set value of an air conditioner provided in a destination facility of a vehicle and is to be used by occupants of the vehicle, according to at least one of (i) a value of a set temperature, (ii) a value of a set humidity, (iii) a value of a set wind direction, and (iv) a value of a set air volume of a vehicle air conditioner mounted on the vehicle; and
send the calculated set value of the air conditioner to a predetermined sending destination.

2. The control device according to claim 1, wherein the processor is configured to calculate the set value that is the set value of the air conditioner provided in the destination facility and is to be used by the occupants by adding a correction value to at least one of the value of the set temperature, the value of the set humidity, the value of the set wind direction, and the value of the set air volume according to an amount of clothing of the occupants.

3. The control device according to claim 1, wherein:
at least one of the value of the set temperature, the value of the set humidity, the value of the set wind direction, and the value of the set air volume of the vehicle air conditioner can be set for each seat of the vehicle; and
the processor is configured to calculate, for the each seat, the set value that is the set value of the air conditioner provided in the destination facility and is to be used by the occupant sitting in the seat.

4. The control device according to claim 1, wherein the predetermined sending destination is a terminal device used in the destination facility.

5. The control device according to claim 1, wherein the predetermined sending destination is the air conditioner provided in the destination facility.

6. The control device according to claim 1, wherein the destination facility includes an accommodation facility, a restaurant, or a home of the occupant.

7. A control device comprising a processor configured to:
calculate a set value that is a set value of an air conditioner provided in a destination facility of a vehicle and is to be used by the occupants, according to at least one of (i) an observed value of a temperature, (ii) an observed value of a humidity, (iii) an observed value of a wind direction, and (iv) an observed value of an air volume in the vehicle; and send the calculated set value of the air conditioner to a predetermined sending destination.

8. The control device according to claim 7, wherein the processor is configured to calculate the set value that is the set value of the air conditioner provided in the destination facility and is to be used by the occupants by adding a correction value to at least one of the observed value of the temperature, the observed value of the humidity, the observed value of the wind direction, and the observed value of the air volume according to an amount of clothing of the occupants.

9. A terminal device used in a destination facility of a vehicle, the terminal device comprising a processor configured to:

receive a set value that is a set value of an air conditioner provided in the destination facility of a vehicle and is to be used by occupants of the vehicle, according to an air conditioning environment including at least one of (i) a value of a set temperature, (ii) a value of a set humidity, (iii) a value of a set wind direction, and (iv) a value of a set air volume of a vehicle air conditioner mounted on the vehicle, or according to at least one of (i) an observed value of a temperature, (ii) an observed value of a humidity, (iii) an observed value of a wind direction, and (iv) an observed value of an air volume in the vehicle and;

output the received set value or send the received set value to the air conditioner.

10. The terminal device according to claim 9, wherein the destination facility includes an accommodation facility, a restaurant, or a home of the occupant.

* * * * *